United States Patent
Conway et al.

(10) Patent No.: US 9,255,897 B1
(45) Date of Patent: Feb. 9, 2016

(54) COMPACT SCANNER APPARATUS

(71) Applicants: Bradley L. Conway, Morristown, NJ (US); Karl E. Geisel, Ringwood, NJ (US); Yaw-Kuen Lin, Parsippany, NJ (US)

(72) Inventors: Bradley L. Conway, Morristown, NJ (US); Karl E. Geisel, Ringwood, NJ (US); Yaw-Kuen Lin, Parsippany, NJ (US)

( * ) Notice: Subject to any disclaimer, the term of this patent is extended or adjusted under 35 U.S.C. 154(b) by 117 days.

(21) Appl. No.: 14/064,259

(22) Filed: Oct. 28, 2013

(51) Int. Cl.
*G01N 23/06* (2006.01)
*G01N 23/02* (2006.01)

(52) U.S. Cl.
CPC ...................................... *G01N 23/02* (2013.01)

(58) Field of Classification Search
CPC ... G01V 5/005; G01V 5/0016; G01V 5/0008; G01V 5/0066; G01V 5/0025; G01V 5/0041; G01V 5/0033; G01V 5/0091; G01V 11/00; G01V 5/0058; G01V 3/08; G01V 3/165; G01V 5/0075; G01V 3/10; G01V 3/104; G01V 5/0083; G01N 2223/419; G01N 23/046; G01N 23/04; A61B 6/107; A61B 6/032; A61B 6/035; A61B 1/00; A61B 17/00; A61B 2217/00; A61B 2218/00; G21F 3/00; G21F 1/12; G21F 1/00; Y10T 29/49826; Y10S 198/95

USPC ............. 378/4, 15, 17, 20, 23–27, 57, 62, 68, 378/195–198
See application file for complete search history.

(56) References Cited

U.S. PATENT DOCUMENTS

| | | | | |
|---|---|---|---|---|
| 3,980,889 A * | 9/1976 | Haas et al. | ...................... | 378/57 |
| 4,020,346 A * | 4/1977 | Dennis | ............................ | 378/57 |
| 4,090,079 A * | 5/1978 | Grassmann | ..................... | 378/18 |
| 4,879,735 A * | 11/1989 | Owens | ............................. | 378/57 |
| 4,977,585 A * | 12/1990 | Boyd | .................................. | 378/4 |
| 2002/0018542 A1* | 2/2002 | Fenkart et al. | .................. | 378/57 |
| 2008/0149864 A1* | 6/2008 | Hargrove | .................. | 250/515.1 |

* cited by examiner

*Primary Examiner* — Irakli Kiknadze
(74) *Attorney, Agent, or Firm* — Michael R. Philips

(57) ABSTRACT

The present invention provides a compact scanner apparatus having a tunnel with a conveyor passing therethrough. A scanning beam, e.g. an X-ray beam, is mounted in the tunnel to view an object being moved on the conveyor. Upper and lower isolation device curtains are mounted at the tunnel entry. Either a single curtain or multiple curtains are mounted at the exit of the tunnel. The lower curtains are opposed pairs hinged to pivot as the object passes through. The upper curtains may be hinged pairs or a single swinging curtain hanging down from a support bar. Alternate embodiments provide bi-directional hinged curtains or multiple tiers of hinged curtains.

20 Claims, 13 Drawing Sheets

COMPACT SCANNER APPARATUS

FIELD OF THE INVENTION

The present invention relates to the field of tunnelized electronic scanner apparatus, and more particularly to reduced length scanner or the like processing apparatus for scanning or processing objects transported through a risk sealed tunnel enclosure, such as are used in contraband detection systems.

BACKGROUND OF THE INVENTION

Tunnelized scanners or processors, including X-ray or risk contraband scanners, are used for detecting contraband at schools, warehouses, correctional facilities, mail screening, courthouse security, airports, and commercial inspection applications. These scanners employ a tunnel housing, typically shielded and often wired in part about the tunnel isolation devices (curtains), a conveying device, a bed assembly housing in which the conveying device is located, and outer skins. The tunnel housing typically has a top portion and side portions, which together with a top surface of the conveyor bed assembly housing, form a substantially enclosed area. The tunnel housing is also formed with entrance and exit openings that are covered by isolation device curtains. The conveyor devices are typically conveyor belts, and may be rollers or other conveyor means. An example of prior art scanners is provided in U.S. Pat. No. 6,304,629 entitled Compact Scanner Apparatus And Method.

An isolation device substantially covers each of the tunnel entrance and exit openings and is typically in the form of slit curtains containing lead held in a vinyl or fabric sheet. One slit leaded fabric curtain is attached to a flat bracket or framing at the entrance opening, and the other slit leaded fabric curtain is attached at the exit opening. Isolation devices permit the passage of conveyed objects into the substantially enclosed area formed by the tunnel housing and the top portion of the bed assembly housing. The fabric curtains are typically X-ray scatter lead shielded, and may also substantially shield light, noise, heat, cold, moisture, welding sparks, electrostatic or electromagnetic fields, dust, gasses or chemical vapors while the conveyed objects are being analyzed, imaged, processed or treated.

A disadvantage to the prior art is that the height of the tunnel determines the length of the tunnel due to the fact that if the hanging curtain is too close to the scanner beam when the curtain is pushed back by the object being conveyed, it would obscure the X-ray scan beam or other source of radiation or linear or confined matter needing to be contained for safety, and therefore block or distort the imaging or processing.

Therefore, the length of the tunnel in the prior art must be at least twice the height of the tunnel. These long lengths result in long, bulky machines that are difficult to transport, including through elevators, store and to locate at sites where space is at a premium. The prior art machines are heavier, use substantially more structural and other material and safety shielding material, generally more attachment points and welds, and are more expensive. For the above reasons, prior art scanner apparatus are more difficult to see around (or easier to hide behind due to larger size). Cost of space per square meter is constantly rising, and tunnel scanning apparatus are popular in cities and high rise government buildings.

SUMMARY OF THE INVENTION

A more compact and cost effective scanning apparatus is provided. The scanner comprises a conveyor device, a tunnel housing, a bed assembly housing, an isolation device, and one or more analysis or processing devices. The tunnel housing is comprised of top and side portions which together with a top surface of the bed assembly housing form a substantially enclosed area for analyzing objects. The bed assembly housing encloses most of the components of the conveyor device.

There are several methods listed in this disclosure for mounting isolation device curtains or doors in order to improve the operation of a tunnelized scanning device or any tunnelized device where unwanted radiation exposure from a process is to be contained within the tunnel while objects are moved through a scanning tunnel, or other risky function with centered midpoint, planer or other source of risk exposure such as welding or spraying.

By attaching isolation device curtains to horizontal brackets attached to a spring loaded hinge, the curtains achieve the isolation requirement without requiring long tunnel lengths. In prior art, the length of the tunnel must be at least twice the height of the tunnel due to the hanging isolation devices being possibly pushed into the scan beam or processing area by the object being scanned.

According to the present invention, the tunnel length only needs to be one half the width of the tunnel plus a little extra for curtain swing where curtain is used instead of metal or other doors. For example, using previous art, a machine with a tunnel 1 meter wide and 1 meter tall would require a tunnel length of over 2 meters. However with this invention, a tunnel 1 meter wide by 1 meter tall would only need to be about 0.55 meters long (½ the width plus a margin), resulting in a much more compact unit and allowing it to be lighter, less expensive in structural material, shielding material and labor, easier to transport, and easier to fit into the environment in which it will be used. This reduction of size is also helpful in mobile units such as scanning devices located inside of vans (which are narrow, the tunnel often placed perpendicular to the length of the van) and for scanners which might need to be moved and/or stored on a regular basis, such as for the secret service events or high traffic schools concerned with vandalism, or lacking space.

Variations of this invention provide multiple levels of swinging isolation devices with different combinations of uni-directional and bi-directional hinges and combinations of traditional hanging and swinging isolation devices, including rigid doors.

Commonly, the isolation devices which substantially cover the entrance and exit openings are in the form of two separate lead curtains, preferably lead fabric curtains. However, the isolation materials can be made of any material which can shield from the radiation generated inside the tunnel, including but not limited to, X-ray, heat, cold, ionizing radiation, sparks, paint spray, chemical spray, etc. Curtains can be made of, but not limited to, lead fabric, solid leaded or shielded material, rigid metal (often shielded), or shielded wood or plastic, or other appropriate materials to shield or enclose the safety risk involved.

Some prior applications might use manually operated leaded curtains or push button doors to isolate the tunnel from the outside. However, this is clumsy and requires time to operate and open and close doors and requires the use of interlocks and possibly motors. This invention allows for the continuous real time movement of objects through the tunnel while maintaining isolation of radiation or other unwanted exposure to the outside without the need to stop the operation and open and close doors or interlocks.

BRIEF DESCRIPTION OF THE DRAWINGS

The present invention is best understood in conjunction with the accompanying drawing figures in which like elements are identified by similar reference numerals and wherein.

DETAILED DESCRIPTION OF PREFERRED EMBODIMENTS

Figure 1:
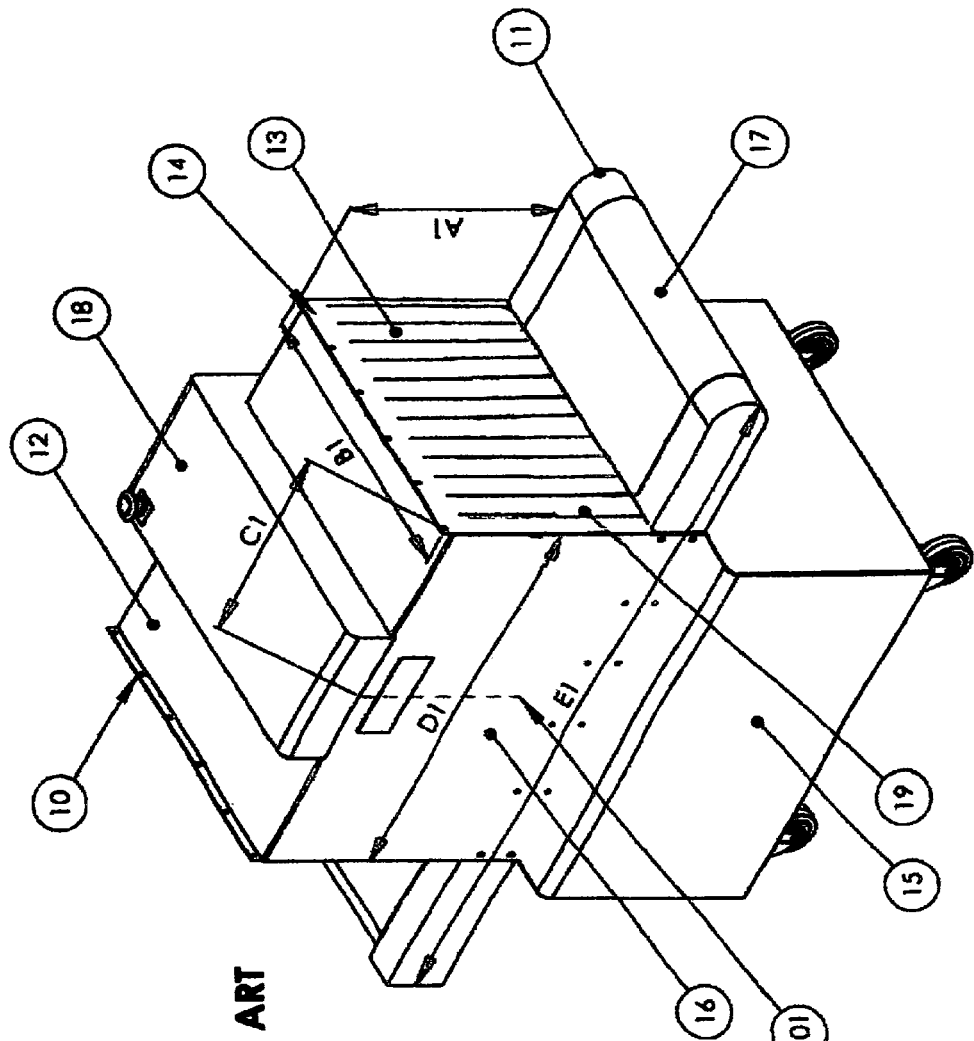
FIG. 1 is a perspective view of a prior art scanner with full curtains.

As illustrated in FIG. 1, a perspective view of a scanner 10 known in the prior art is shown. The scanner 10 includes top 12, tunnel sides 16, detector tray assembly 18, tunnel opening 19, bed assembly housing 11, generator 15 and isolation device curtain 13. A movable conveyor belt is shown at 17. The X-ray scanning fan or rastered beam is indicated by numeral 101.

The prior art scanner 10 has a tunnel height of A1 and overall tunnel width of B1. The length of the tunnel is D1 and the entire length of the conveyor bed is E1. The length of the isolation device curtain 13 is equal to A1 and the distance between curtain 13 and the scanning X-ray beam is C1. Since the isolation device curtain is made of a material that will block X-rays, it is imperative that the isolation device does not enter the scanning X-ray beam. Therefore, in the case of an object (not shown) of height near A1 being conveyed through the tunnel 16, isolation device 13 must be able to bend into the tunnel until the isolation device curtain is substantially horizontal at the top of the tunnel and resting on top of the large object being scanned. Because of this scenario, the distance between the opening of the tunnel and X-ray beam C1 cannot be less than the length of the isolation curtain A1.

A significant factor in the length of the entire unit E1 is determined by C1. If this distance can be reduced, the length of the entire unit can be reduced, having the advantage of the machine being smaller, easier to store, ship, fit through doors, move around corners, and operate in a smaller space.

Figure 2:
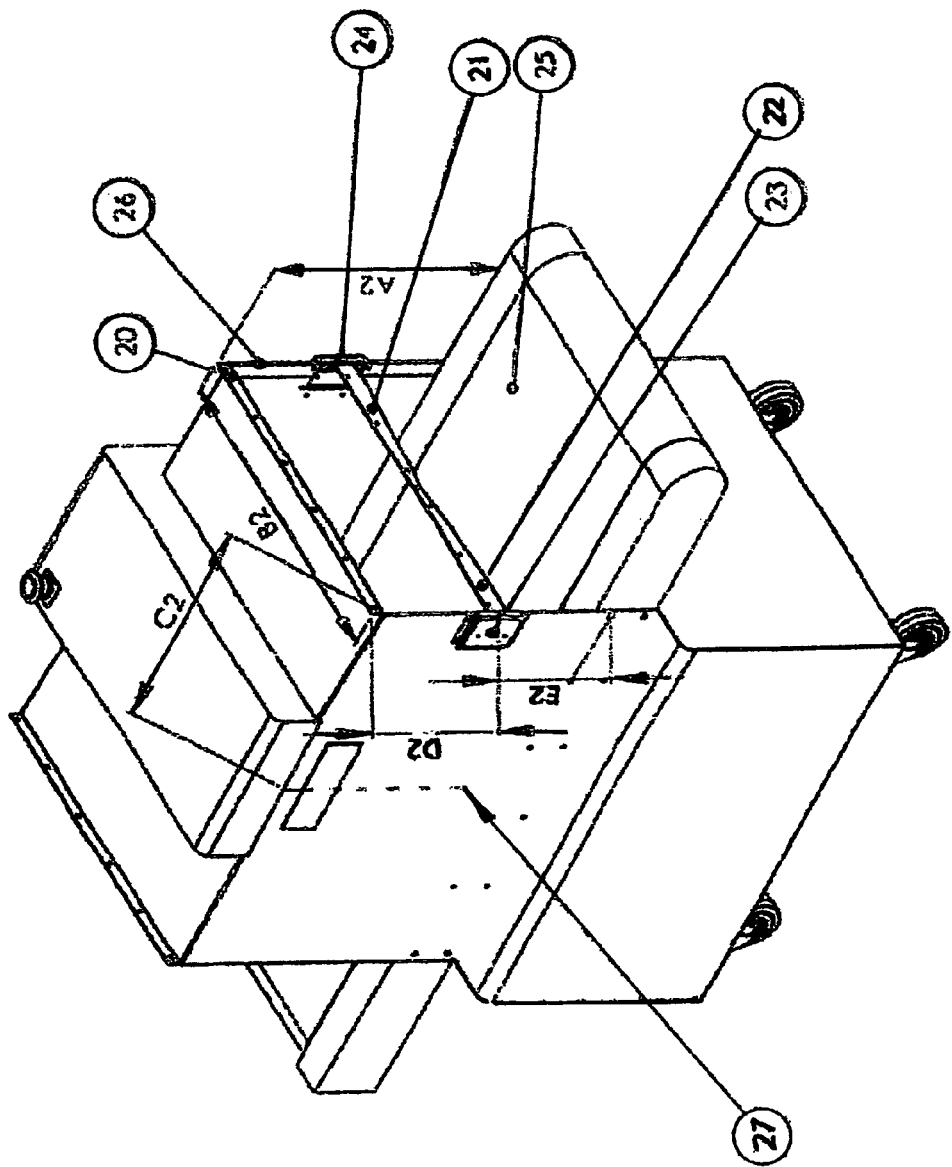
FIG. 2 is a perspective view of a scanner with one embodiment of a hinged bracket of the present invention without hanging curtains.

Referring now to FIG. 2, an alternate method of attaching curtains is shown. In previous art of FIG. 1, the isolation device 13 was connected to the tunnel using bracket or member 14. However, in FIG. 2 there are multiple brackets to attach isolation device curtains, the first being bracket 20, similar to bracket 14, and two other brackets 21 and 22 which are connected to hinges 23 and 24. The top of brackets 21, 22 are located a distance E2 from the conveyor base and belt top surface 25. The top of brackets 21, 22 are also located D2 from the top of the opening of tunnel 26. Hinges 23, 24 permit brackets 21, 22 to swing in opposite arcs toward the respective walls of tunnel 26. A2 is the total height of tunnel 26 and C2 is the distance between the opening edge of the tunnel 26 and the X-ray scan beam 27.

Figure 3:
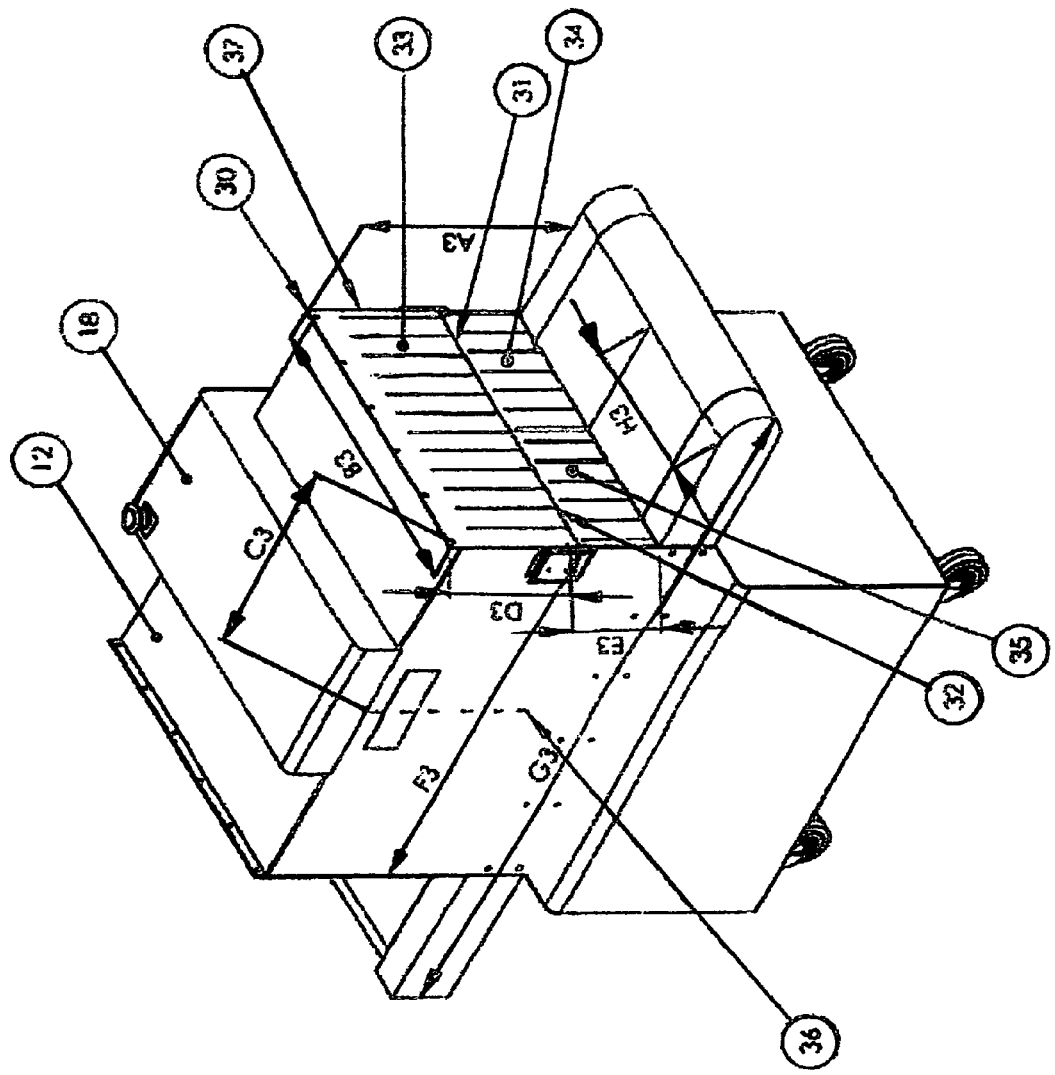
FIG. 3 is a perspective view of the embodiment of FIG. 2, shown with hanging curtains.

FIG. 3 shows the scanner apparatus of FIG. 2 in perspective view with isolation device curtains 33 and 34 attached. Top curtain 33 is attached to the top bracket 30, right bottom curtain 34 is attached to right lower bracket 31, and left bottom curtain 35 is attached to left lower bracket 32. The height D3 of top curtain 33 plus the height E3 of lower curtains 34, 35 is sufficient to totally close the entry of the tunnel. Because isolation device curtain 33 hanging from bracket 30 can be a shorter length than devices known in the prior art, the distance between the X-ray scan beam 36 and the edge of the tunnel 37 measured by C3 can now be equal or greater than the length D3 of isolation device curtain 33. Also, the distance between the X-ray scan beam 36 and the edge of the tunnel 37 measured by C3 can now be equal or greater than the width of the swinging isolation device curtains 34, 35 measured by one half B3. Therefore the tunnel length F3 can be shorter and the resulting length of the machine G3 can also be shorter. Alternately, isolation devices 35 and 34, hanging from brackets 32 and 31, do not need to be soft lead embossed curtain material. They can be made of any material and could also be solid doors made of a variety of materials which meet the isolation requirements of the application.

Figure 4:
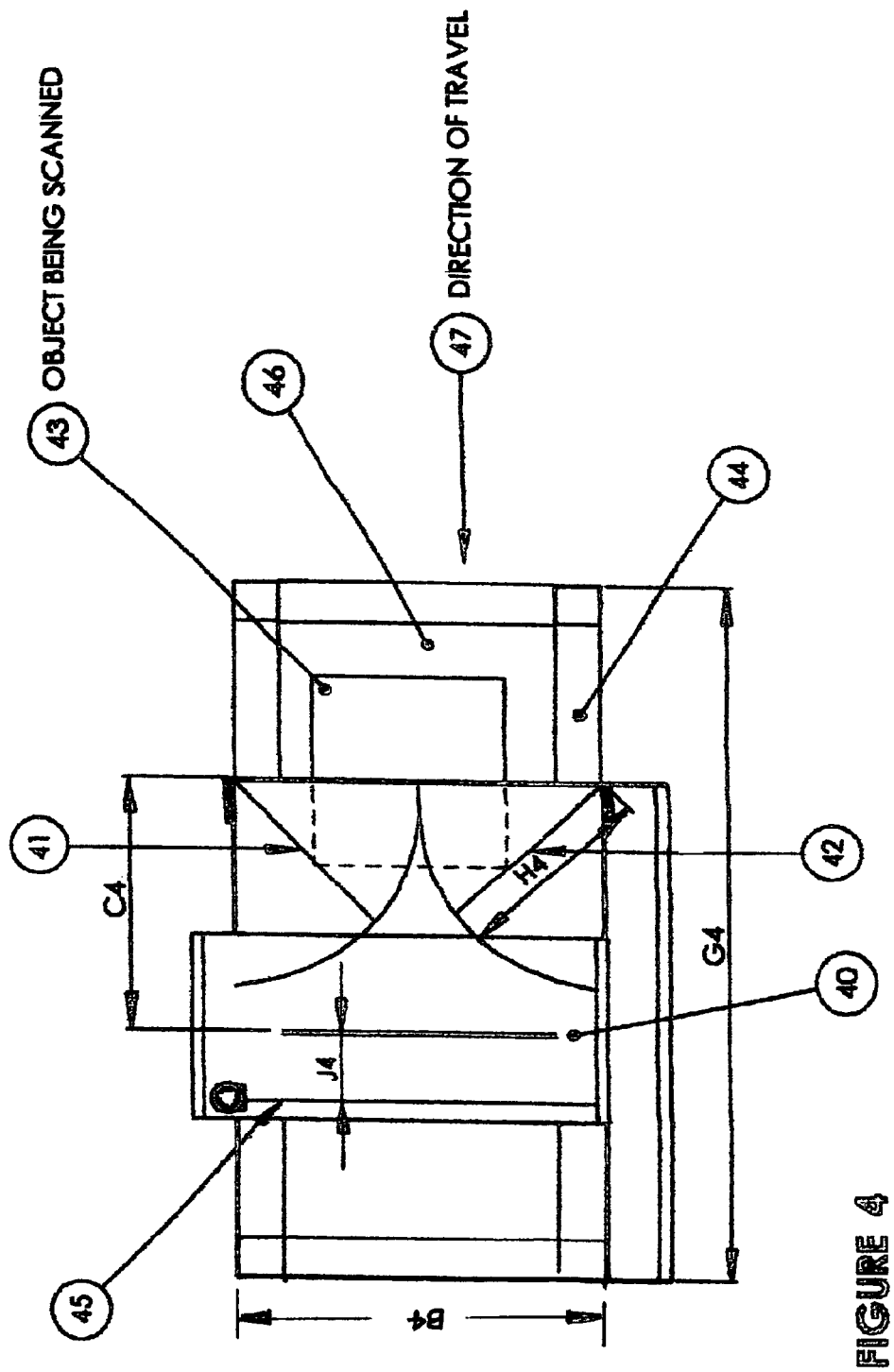
FIG. 4 is a top plan view of the embodiment of FIG. 3, showing direction of movement of the entrance hanging isolation curtain, and the position of an exit isolation curtain.

FIG. 4 shows a top view of the embodiment of FIG. 3. The X-ray scan beam 40 scans the object going through the tunnel of width B4. The conveyor belt 46 is primarily moved in the direction shown in 47. An object to be scanned 43 is placed on the conveyor 46 and moved in the direction of travel 47. The lower isolation device curtains 41 and 42 are pushed inward by the forward edges 44 of the object being scanned 43. The length of each curtain arm 41, 42 is ½ the total width of the tunnel equal to H4. The length of the arms 41, 42 must be smaller than C4 or else the arms and isolation device will block X-ray beam 40 and distort the image of the object being scanned 43.

FIG. 4 also shows the design of the exit isolation device curtain 45. While prior art requires that the exit curtain must be at a distance of C4 from the X-ray scanning beam 40 due to the largely uni-directional configuration of this embodiment, the exit isolation device curtain 45 can be positioned much closer to the beam 40 at a distance of J4. The only limiting factor of how small J4 can be is how far back the isolation device curtain 45 will swing toward beam 40 once an object 43 goes through the exit isolation device 45. This will significantly shorten the entire machine length G4.

It should be noted in FIG. 4 that an object to be scanned 43 can still be reversed if there is an object jam or other problem, although it is possible that the curtain might block the beam. This would not create any problems other than a distorted image. However, the operators are instructed only to scan in the direction of travel 47 for proper imaging.

Figure 5:
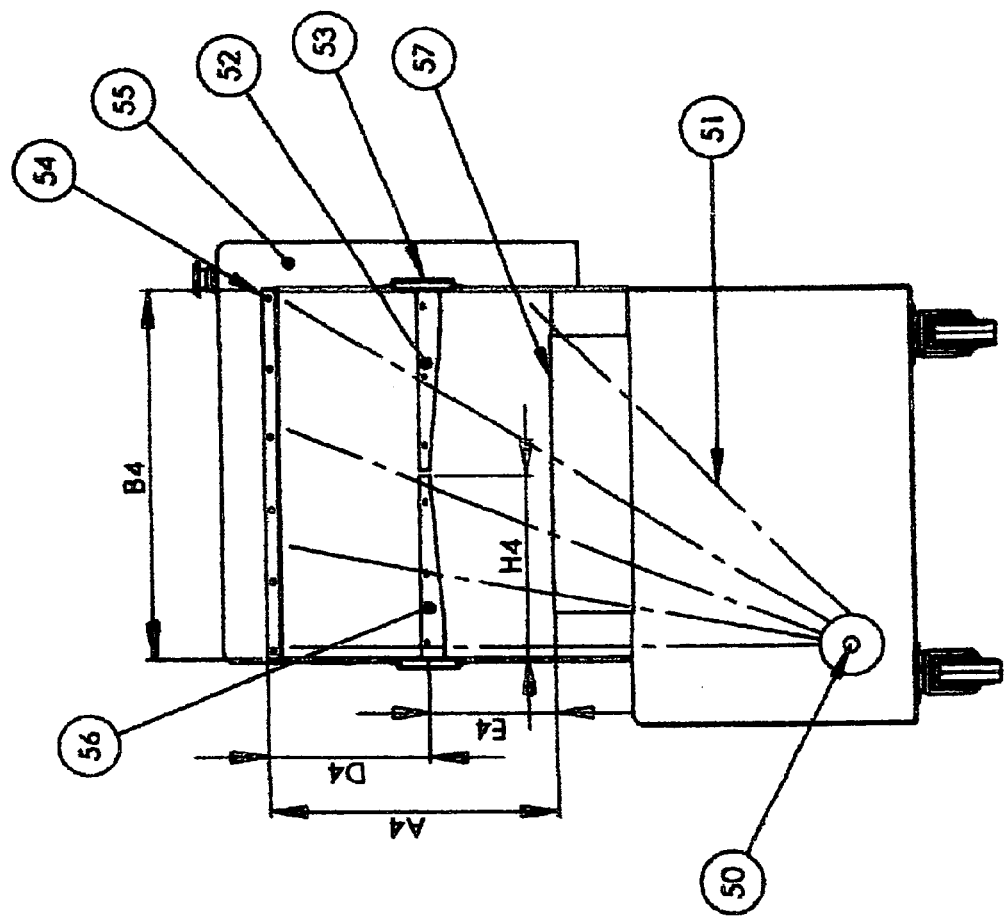
FIG. 5 is a front elevation view of the preferred embodiment showing the hinge brackets and hanging brackets.

FIG. 5 shows a front view of a version of the invention including the X-ray generator 50 and the fan beam 51 projected by generator 50. The object to be scanned is placed on the top of the conveyor belt 57. The detectors are housed in the detector tray 55. The hinge 53 is attached to the arm 52 to be free to swing in either an inward or outward direction relative to the tunnel. The hinge 53 is spring loaded so that arm 52 returns to rest in a position perpendicular to the direction of travel of the object being scanned. The length of each of the arms 52 and 56 is H4 which is typically one half of length B4. However, arms 52 and 56 could be of shorter lengths, depending on the material of the curtains suspended therefrom.

Isolation device curtains are to hang from swinging arms 52, 56 and top stationary bracket 54. However, in an alternate embodiment, it is possible that the top isolation device curtain is eliminated and height E4 be extended to equal height A4. This would not affect the length of C4 (see FIG. 4) which would still be at least as long as length H4. Furthermore, the height D4 of the upper hanging curtain is preferably not longer that the width H4 of a lower hinged curtain to minimize the distance to the scanning beam.

Figure 6:
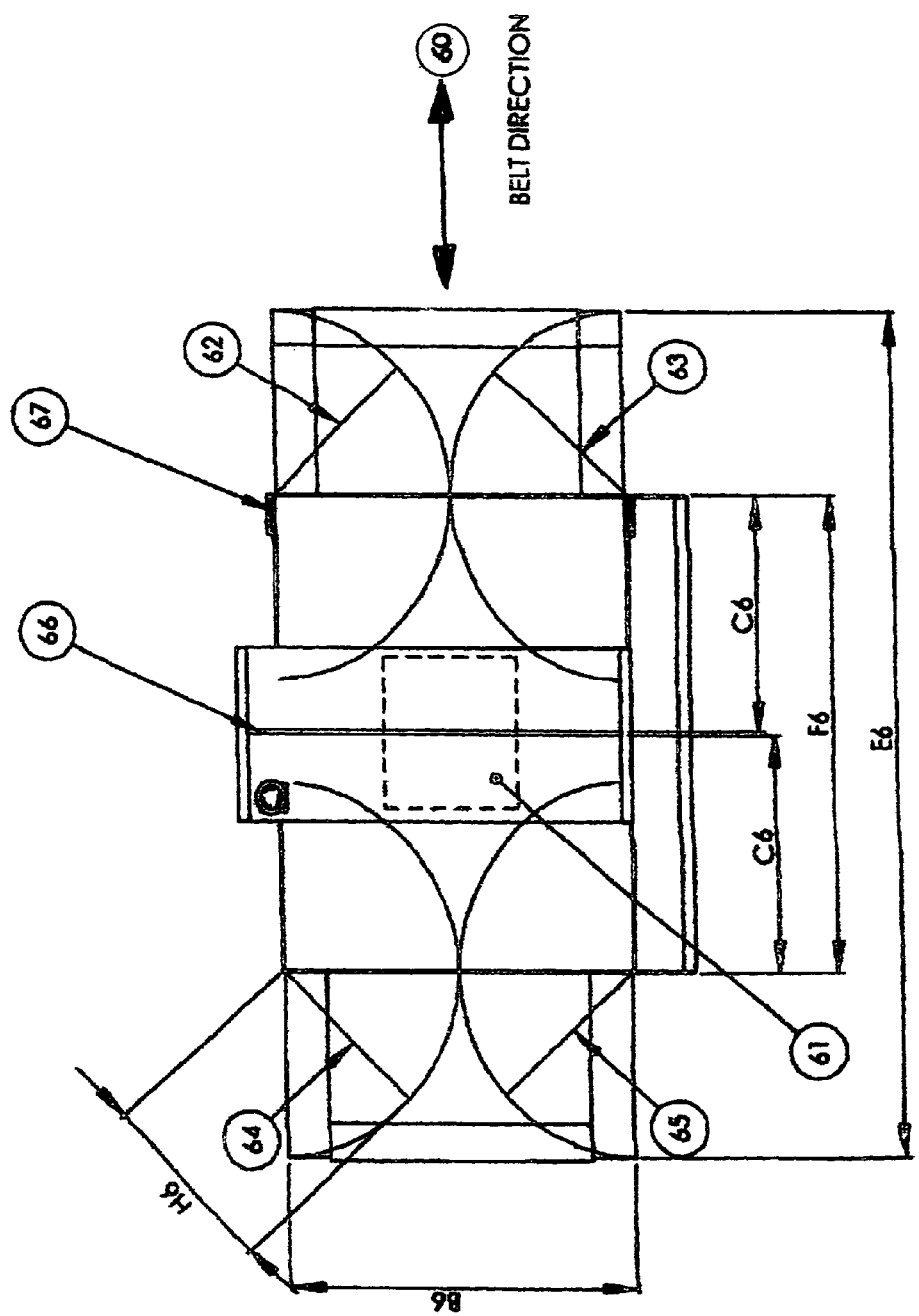
FIG. 6 is a top plan view of another embodiment showing multiple direction hinges and hanging brackets to hold isolation curtains.

FIG. 6 shows the top view of an alternate embodiment which has doors on exit and entrance. Swinging isolation device curtains 62, 63, 64, 65 can swing both in toward the inside of the tunnel and swing out of the tunnel. This allows for the object being scanned 61 to be able to move in either direction 60 without any of the isolation devices 62, 63, 64, 65 blocking the beam 66. In this embodiment, the distance between the X-ray scan beam 66 and the end of the tunnel 67 is C6 for both entrance and exit and C6 cannot be smaller than H6. Therefore, the distance F6 is twice C6 and would require a larger overall machine length E6 than the embodiment in FIG. 4, the resultant machine being more versatile.

Figure 7:
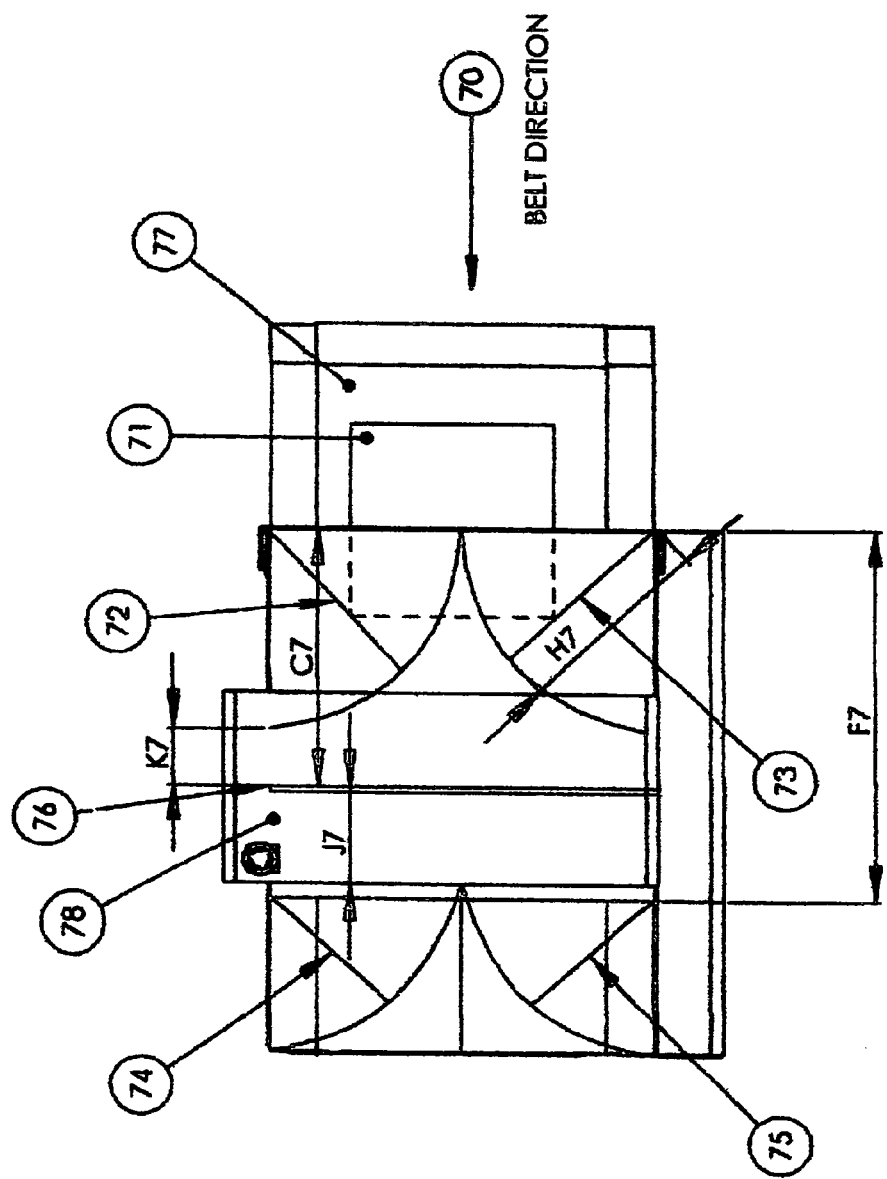
FIG. 7 is a top plan view of another embodiment showing uni-directional hinged isolation curtains on entrance and exit.

FIG. 7 shows another embodiment where the object to be scanned 71 is placed on the conveyor bed 77 and is primarily intended to be scanned in a single direction 70. In this scenario, there are hinged doors or a combination of hinged doors and top hanging curtains on both the entrance and exit sides of the tunnel. Doors 72 and 73 are at the entrance and swing into the tunnel by being pushed in by the front of the object to be scanned 71. The length of the doors H7 cannot be any longer than C7 or else they will interfere with X-ray scan beam 76. The exit doors are 74 and 75 and they only swing out to allow the distance between the exit and the X-ray scan beam 76 to be limited by the size of the detector tray 78 which is J7. The tunnel overall length is F7.

Figure 8:
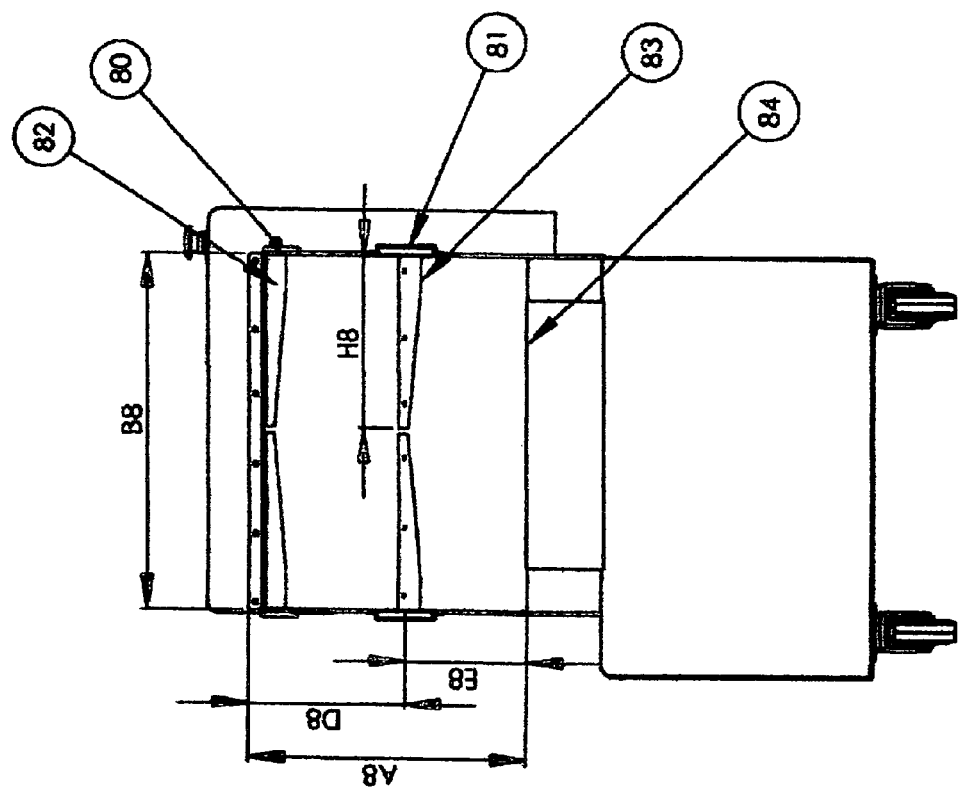
FIG. 8 is a front elevation view of another embodiment showing two levels of hinge brackets.

An alternate configuration front elevation view is shown in FIG. 8. This depicts an invention where there are 2 or more levels of hinges 80 and 81 and 2 or more levels of arms 82, 83 mounted to the hinges 80 and 81. Isolation device curtains (not shown) are hanging on arms 82 and 83. The same is repeated on the exit side of the tunnel. One advantage of this configuration is that for a large height A8 dimension compared to a smaller B8 width dimension, the tunnel size can still be kept to a minimum because multiple levels of curtains can be added. If a top hanging curtain 33 (see FIG. 3) were to be as long as D8, the distance between the X-ray scan beam and the edge of the tunnel would also need to be long. However, when multiple levels of hinged isolation devices are used, the distance between the X-ray scan beam and the edge of the tunnel is only dictated by ½ the tunnel width B8, i.e. H8. Therefore very tall machines do not need to be very long. This is particularly useful in large machines used to scan cargo. By using multiple levels of hinged isolation devices, e.g. three or four curtains, the length of the scanning machine could be reduced while allowing the object being scanned to move easily through the curtains. In this configuration, the hinged isolation devices can be uni-directional as in FIG. 7, bi-directional as in FIG. 6, or with a simple full hanging curtain at the exit as seen in FIG. 4. A multiplicity of doors also creates smaller openings to reduce the amount of radiation which may escape from the scanning device.

It should also be noted that any combination of hinged doors could be used such as bi-directional on input as in FIG. 6 or uni-directional on exit as in FIG. 7. It is also possible to have a full length exit hanging curtain 13 as in the prior art shown in FIG. 1, but have a uni-directional or bi-directional hinged door at the entry of the tunnel.

Figure 9:
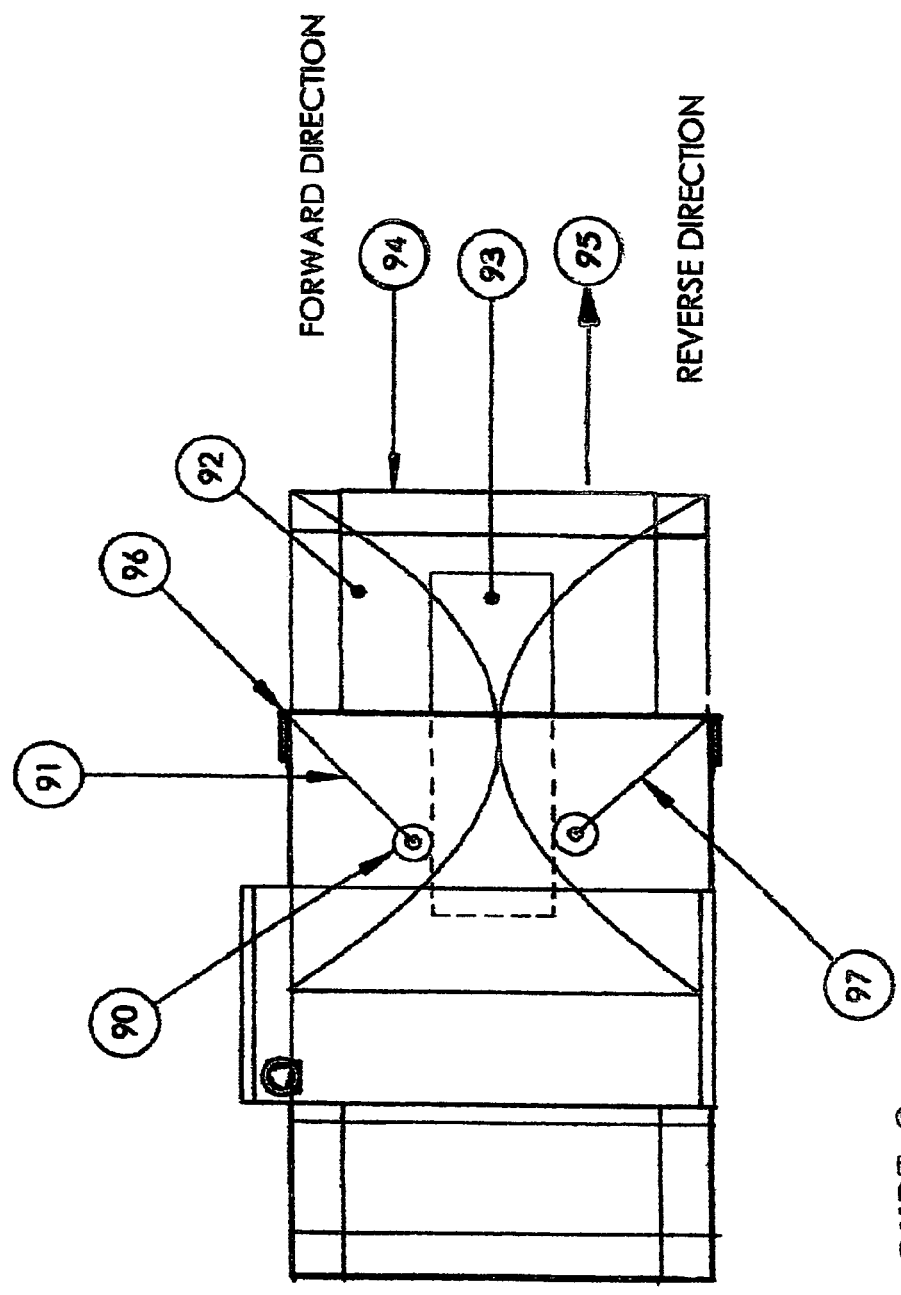
FIG. 9 is a top plan view of another embodiment showing bi-directional hinged isolation devices that may be used on entrance and exit.

FIG. 9 shows an additional method of improving the movement of objects through the swinging door isolation devices. Hinged arms 91, 97 are each attached to a spring loaded hinge 96. As an object to be scanned 93 moves in a forward direction 94 on the conveyor 92, the hinged arms 91 and 97 open to let object 93 pass. However, if the belt 92 is stopped and then reversed to go in reverse direction 95, the springs on hinges 96 will force arms 91 and 97 to clamp down on object 93, preventing object 93 from reversing. However, a set of wheels or rollers 90 are mounted to the ends of arms 91, 97 to rotate and allow object 93 to more easily pass through the tunnel in either the forward or reverse direction.

The isolation device curtains can be made of any material which provides shielding against the escape of radiation or other unwanted condition generated inside the tunnel, e.g. X-ray, heat, cold, ionizing radiation, paint spray, chemical spray, etc. The curtains for radiation shielding can be made of, but are not limited to, lead fabric curtains, solid leaded material, flexible lead or other metal, etc. For shielding other conditions, curtains may be made of plain or coated fabric or plastic sheet material.

Figure 10:
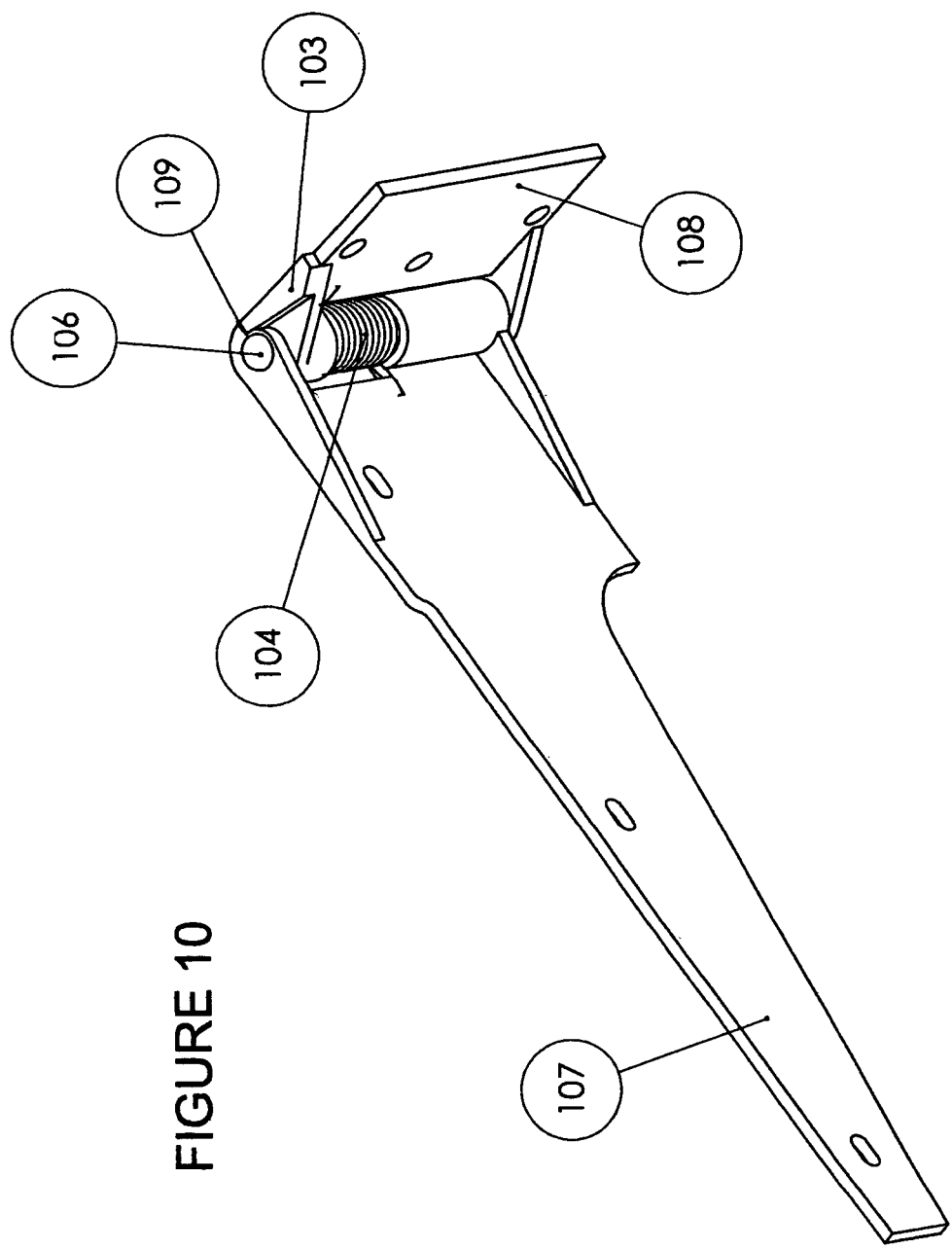
FIG. 10 is a perspective detail view of a hinge and bar for a hanging isolation device.

FIG. 10 shows a detailed view of a left hinge from which an isolation device curtain is to be hung. The right side hinge is similar to the left. Hinge plate 108 is configured to be attached to a side wall of the tunnel. Hinge arm 107 extends at approximately a 90° angle to hinge plate 108. The hinge pin 106 holds all parts together and provides a pivot axis. The spring 104 applies torque to the hinge arm 107 when hinge arm 107 is rotated and urges the hinge arm 107 to swing back into the rest position shown. The movement of hinge arm 107 to rest position is stopped by metal piece 103 as contact is made between hinge arm 107 and hinge plate 108 at point 109. An isolation device curtain is to be hung from hinge arm 107.

Figure 11:
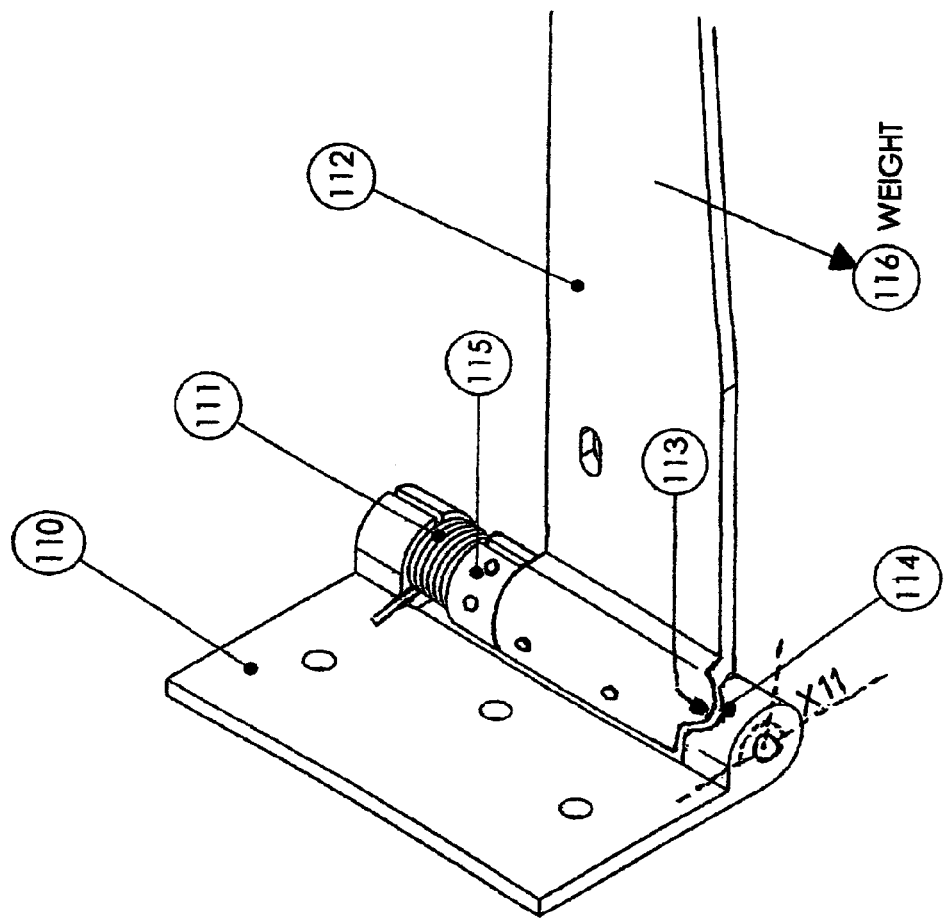
FIG. 11 is a perspective detail of the left hinge and bar from which the isolation device is hung that is able to swing in both directions.

FIG. 11 shows a detail of a further embodiment left hinge from which the isolation device curtain is to be hung, the hinge arm of which is intended to swing in both directions. The right side hinge is similar to the left. Hinge plate 110 is configured to be attached to a side wall of the tunnel. The hinge arm 112 is pivotally connected to hinge plate 110. The torque shoulder bolt 115 is attached to spring 111 and is used to adjust spring tension. The shoulder bolt 115 has a hexagonal inner sleeve which fits inside the tubular end of hinge arm 112. The isolation device curtain is to be hung from hinge arm 112. The spring allows the hinge to swing in both directions but a method is provided to allow hinge arm 112 to swing to 0 degrees (angle X11 equals 0) where arm 112 is basically in substantially parallel alignment with hinge plate 110, or almost touching, but hinge arm 112 can also swing to 180 degrees (X11 equals 180) where hinge plate 110 and hinge arm 112 are in linear extended alignment in the same plane. However, the hinge must sit at 90 degrees (X11 equals 90 degrees, as shown in FIG. 11) when at rest. This rest position condition is achieved by top tab 113 settling into notch 114, where the weight of the isolation device hanging from arm 112 presses downward as indicated by weight 116, forcing the tab 113 to settle into notch 114, stopping the motion of hinge arm 112 at 90 degrees (X11 equals 90 degrees as shown).

Figure 12:
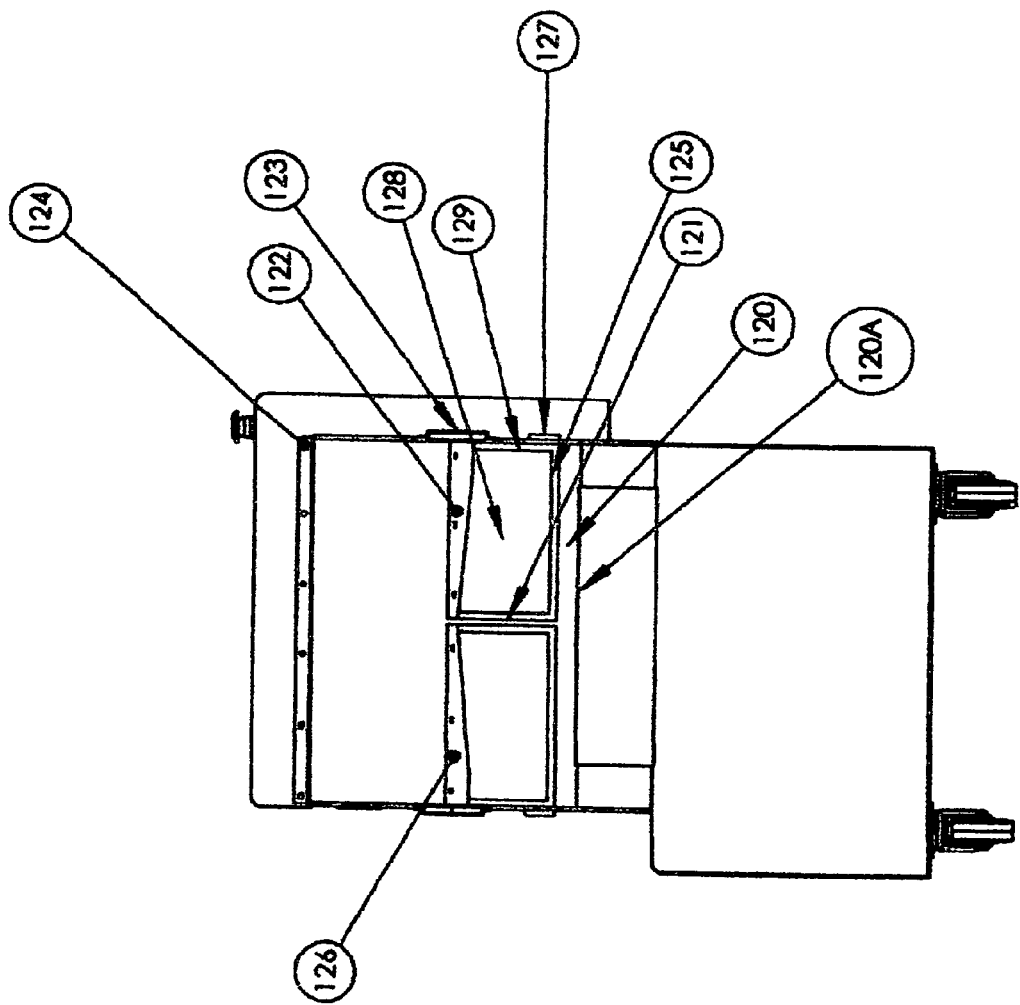
FIG. 12 is a front elevation view of an alternate version of the invention whereas the isolation device is prevented from swinging back further.

FIG. 12 shows a front view of an alternate version of the invention. The object to be scanned is placed on the top of the conveyor belt 120A. The hinge 123 is attached to the arm 122 allowing arm 122 to swing in either an inward direction or in an inward and outward direction. The hinge 123 is spring loaded so the arm 122 always returns to a rest position perpendicular to the direction of travel of the object being scanned when released.

Isolation device curtains 128 hang from arms 122, 126 and a similar curtain hangs from top stationary bracket 124. However, it is possible for a flexible curtain to get caught on the object being scanned to push the curtain further back than desired. The distance K7 (seen in FIG. 7) can be further shortened if the swing of the curtain is minimized. This can be accomplished by adding a stiffening member 121 to prevent flexible isolation device 128 from blocking the scanning beam. Optionally, additional stiff framing members 125 and 129 can be added. Optionally, a lower hinge 127 can be added to further stiffen assembly and allow the distance K7 (see FIG. 7) to be minimized. Attaching a lower flexible isolation device curtain 120 to the bottom of flexible member 125 and allowing it to touch belt 120A allows for a tighter isolation from radiation.

Alternately, flexible isolation device 128 can be replaced with a stiff isolation device such as a metal sheet covered with lead, a stiff lead sheet, metal sheet, or a combination of materials to eliminate the need of stiffening devices 121, 125 and 129, and allow the stiffness of the metal sheet at 128 to suffice.

Figure 13:
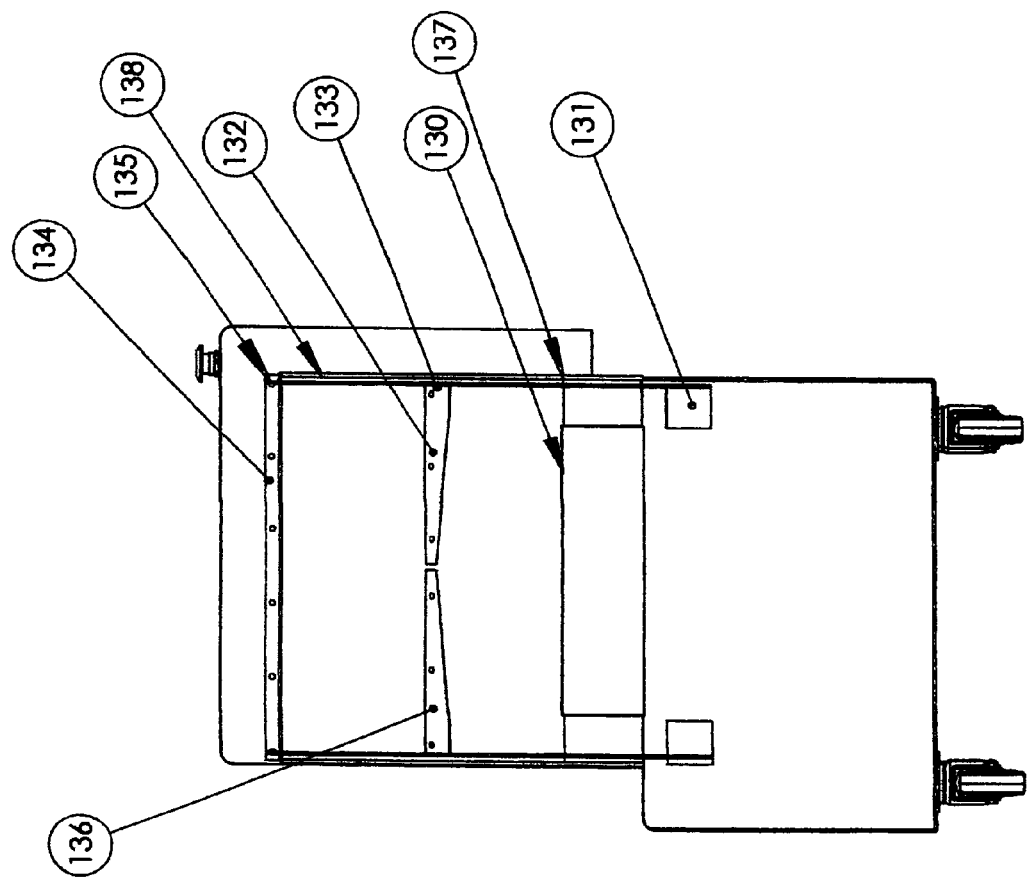
FIG. 13 is a front elevation view of an alternate method of attaching hanging arms.

FIG. 13 shows a front view of an alternate method of attaching hanging arms 132 and 136. Isolation device curtains hang from arms 132, 136 and top stationary bracket 134. The object to be scanned is placed on the top of the conveyor belt 130. Instead of attaching hinge 123 (see FIG. 12) to the side of the tunnel, a long stiff metal or other type of rod 138 is fixedly attached to the hanging arm 132. The rod 138 is free to rotate and is attached to the tunnel at points 135 and 137 using a simple bearing assembly or other method of attaching a rotating rod to a fixed surface. Additional small attachment points could be made on the vertical surface of the tunnel to prevent the rod 138 from bending. The rod 138 enters below the conveyor bed 130 into the base of the machine at 137. The rod 138 then attaches to a spring assembly at 131. By allowing the spring assembly 131 to be located in the base of the machine, the assembly can be larger and more complicated without increasing the width of the machine. Alternately, the spring assembly 131 can be located at the top of the tunnel at 135.

Furthermore, the spring assembly 131 can be replaced with an active method of rotating the rod 138 and therefore moving the arm 132. This active method could be an electric motor drive, hydraulic drive, or pneumatic drive. This could be useful in very large machines where the isolation devices are heavy and cannot be moved by the object going through the tunnel.

While a simple X-ray scanner with a single X-ray scan beam is shown in the accompanying drawings, this invention can be used in many different applications. A very useful application of this invention would be in systems where there is a linear or other collimated X-ray scan beam used in combination with an additional generator having a rotating wheel forming a moving pencil X-ray beam in conjunction with backscatter detectors. Since these one or more X-ray generator machines tend to be long, using the embodiments of the present invention would help shrink the overall footprint, especially the length. Another similar application would be a combination of a linear X-ray scanner used in conjunction with a Computer Aided Tomography (CAT) scanner, for the same reasons as listed above. Also, this invention could easily be used in any tunnelized backscatter machine, CAT scanner, diffractioning fluorescent, or laser based scanner, even if it did not include a linear X-ray scanner.

Another useful application for this invention would be in the use of a system where materials such as mail are irradiated to kill spores or any other pathogens. Rigid shielded doors might then be preferable due to high isolation doses. This would allow the device to be of shorter footprint and length, less cost, weight and more easily moved about. Any other tunnelized system could make use of this invention. This could be used for a tunnelized heating and freezing system as well as welding and paint spraying.

While a mechanized conveyor is listed in this specification, any conveyance scheme could be used with this invention including, but not limited to, roller beds, tracks, carts, etc.

While the description above discloses preferred embodiments of the present invention, it is contemplated that numerous variations and modifications of the invention are possible and are considered to be within the scope of the claims that follow.

What is claimed is:

1. A compact scanner apparatus having a scanning beam mounted within a tunnel through which objects are carried on a conveyor, the compact scanner apparatus comprising:
   a. a first isolation device curtain mounted to the tunnel in a manner to cover an upper portion of an entry of the tunnel;
   b. a second isolation device curtain mounted to the tunnel in a manner to cover a lower portion of the entry of the tunnel;
   c. the first and second isolation device curtains substantially covering the entry of the tunnel;
   d. when the first and second isolation device curtains are in a rest position, the second isolation device curtain resides coplanar with the first isolation device curtain; and
   e. a third isolation device curtain mounted to the tunnel in a manner to cover an exit of the tunnel.

2. The scanner apparatus described in claim 1, wherein the first isolation device curtain is suspended from a horizontally oriented bracket extending across a top edge of the tunnel entry, and wherein the first isolation device curtain comprises a sheet freely hanging downward.

3. The scanner apparatus described in claim 1, wherein the third isolation device curtain is suspended from a horizontally oriented bracket extending across a top edge of the tunnel exit, and wherein the third isolation device curtain comprises a sheet cut into an array of vertical strips freely hanging downward.

4. The compact scanner apparatus described in claim 3, wherein the third isolation device curtain further comprises a first side sheet suspended from an arm that is mounted to the tunnel to pivot around a vertical axis located at a first side edge of the tunnel exit, and a second side sheet suspended from an arm that is mounted to the tunnel to pivot around a vertical axis located at a second side edge of the tunnel exit, whereas the first and second side sheets contact one another at a line between the first and second side edges.

5. The compact scanner apparatus described in claim 4, wherein when in a rest position, the first side sheet and the second side sheet each reside coplanar with the sheet of vertical strips.

6. The compact scanner apparatus described in claim 1, wherein the third isolation device curtain is mounted closer to the scanning beam that resides within the tunnel than the first and second isolation device curtains.

7. The compact scanner apparatus described in claim 3, wherein the third isolation device curtain is mounted closer to a scanning beam than the first and second isolation device curtains.

8. The compact scanner apparatus described in claim 1, wherein the third isolation device curtain comprises a first side sheet suspended from an arm that is mounted to pivot around a vertical axis located at a first side edge of the tunnel exit and a second side sheet suspended from an arm that is mounted to pivot around a vertical axis located at a second side edge of the tunnel exit, whereas the first and second side sheets contact one another between the first and second side edges.

9. The compact scanner apparatus described in claim 1, wherein the arms suspending the first and second side sheets are pivotable through a limited arcuate range.

10. A compact scanner apparatus having a scanning beam mounted within a tunnel through which objects are carried on a conveyor, the compact scanner apparatus comprising:
   a. a first isolation device curtain mounted to the tunnel in a manner to cover an upper portion of an entry of the tunnel;
   b. a second isolation device curtain mounted to the tunnel in a manner to cover a lower portion of the entry of the tunnel;
   c. the first and second isolation device curtains substantially covering the entry of the tunnel; and
   d. a third isolation device curtain mounted to the tunnel in a manner to cover an exit of the tunnel;
   e. wherein the second isolation device curtain comprises a first side sheet suspended from a first arm that is mounted to pivot around a vertical axis located at a first side edge of the tunnel entry and a second side sheet suspended from a second arm that is mounted to pivot around a vertical axis located at a second side edge of the tunnel entry, whereas the first and second side sheets contact one another between the first and second side edges.

11. The compact scanner apparatus described in claim 10, wherein when the first and second isolation device curtains are in a rest position, the second isolation device curtain resides coplanar with the first isolation device curtain.

12. The compact scanner apparatus described in claim 10, wherein the arms suspending the first and second side sheets are pivotable through a limited arcuate range.

13. The compact scanner apparatus described in claim 12, wherein the limited arcuate range of pivoting comprises substantially 90°.

14. The compact scanner apparatus described in claim 12, wherein the limited arcuate range of pivoting comprises substantially 180°.

15. The compact scanner apparatus described in claim 10, wherein a distance from the tunnel entry to the scanner beam is greater than ½ a width of the tunnel entry.

16. The compact scanner apparatus described in claim 10, further comprising a first stiffening member affixed to a vertical edge of each of the first and second side sheets, the vertical edges located distal from each respective vertical axis.

17. The compact scanner apparatus described in claim 16, further comprising a second stiffening member affixed to a lower horizontal edge of each of the first and second side sheets.

18. The compact scanner apparatus described in claim 10, further comprising a roller assembled to an end of each arm, the arm end located distal from each respective vertical axis.

19. The compact scanner apparatus described in claim 10, wherein a vertically oriented pivoting rod is mounted at each vertical axis and the first and second side sheets are mounted to a hanging arm affixed to each respective rod, the rods being biased to return the hanging arms to a rest position in which the side sheets substantially close the tunnel entry.

20. The compact scanner apparatus described in claim 10, wherein a vertically oriented pivoting rod is mounted at each vertical axis and the first and second side sheets are mounted to a hanging arm affixed to each respective rod, the rods being rotated by drive means.

* * * * *